June 3, 1941.  W. H. HARTFORD  2,244,457
MINNOW PAIL
Filed July 5, 1940
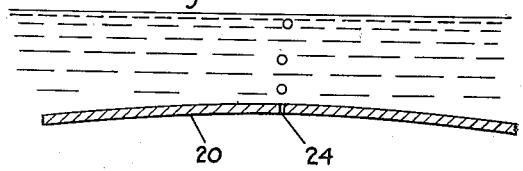
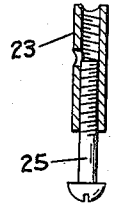
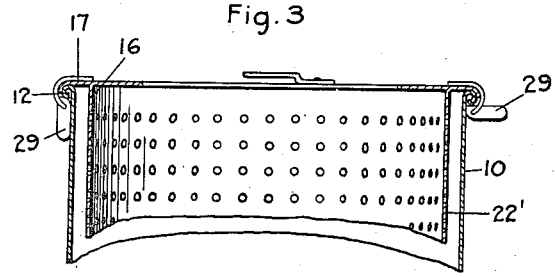
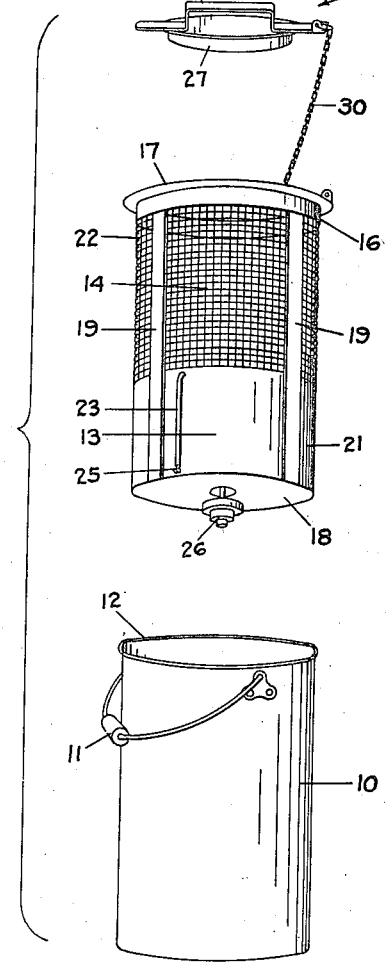
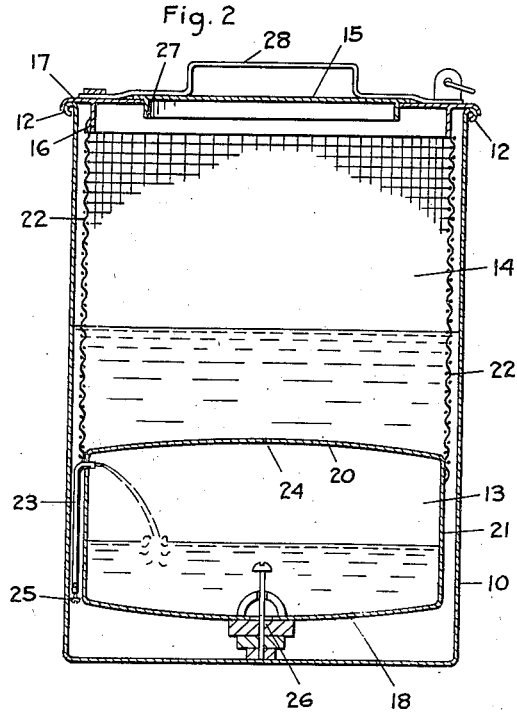
INVENTOR.
W. H. Hartford
BY Emil F. Lange
ATTORNEY.

Patented June 3, 1941

2,244,457

UNITED STATES PATENT OFFICE 2,244,457

MINNOW PAIL

Winfield H. Hartford, Kearney, Nebr.

Application July 5, 1940, Serial No. 344,103

3 Claims. (Cl. 43—56)

My invention relates to minnow pails of the kind used on fishing trips for keeping the minnows in prime condition for bait.

The primary object of my invention is the provision of a minnow pail for more effectively aerating the water in which the minnows are kept.

Another of my objects is the provision of a minnow pail in which the water may be aerated with the least expenditure of time and effort.

Another of my objects is the provision of a minnow pail having an upper minnow chamber and a lower air chamber for the passage of air at a slow rate into the minnow chamber.

Another of my objects is the provision of a minnow pail having contiguous minnow and air chambers with a small aperture from the air chamber for the slow passage of air into the minnow chamber and having means for introducing a controlled flow of water into the air chamber to thereby force air from the air chamber into the minnow chamber.

Another of my objects is the provision of a combined minnow chamber and air chamber inside an outer pail and so arranged that the aeration of the water in the minnow chamber may be accomplished by occasionally lifting the combined minnow and air chamber.

Having in view these objects and others which will be pointed out in the following description, I will now refer to the drawing, in which Figure 1 is a view in perspective of the three parts of my minnow pail. The pail being shown disassembled and in the position ready for assemblage.

Figure 2 is a vertical sectional view of the assembled minnow pail.

Figure 3 is a vertical sectional view in a plane at right angles to that of Figure 2 but with the lid omitted.

Figure 4 is a sectional view in greatly enlarged scale showing particularly the aperture between the air chamber and the minnow chamber.

Figure 5 is an enlarged sectional view of the means for adjusting the flow of water into the air chamber.

The minnow pail includes three parts: the pail 10 having the usual bail handle 11 and a rolled upper edge 12, the combined air chamber 13 and the minnow chamber 14, and the lid 15. As shown in Figure 2 the combined air chamber and minnow chamber seats in the pail 10 and the lid 15 seats on the combined air chamber and the minnow chamber.

The combined air chamber 13 and minnow chamber 14 is provided with a collar 16, having an out-turned flange 17, the bottom 18 is circular and formed of sheet metal. The collar 16 and the bottom 18 are united in parallelism by means of straps 19 for reinforcement. Intermediate the top and the bottom is a partition 20 of sheet metal which is dished upwardly as best shown in Figures 2 and 4. The bottom 18 is also dished but downwardly instead of upwardly. As shown in Figure 2, an air chamber is thus formed between the spaced bottom 18 and the top 20 which are connected by a cylindrical wall 21 of sheet metal, all of the joints being hermetically sealed. Surrounding the ribs 19 above the wall 20 is a wall 22 of a suitable metal fabric which permits the free flow of water therethrough but which does not permit the passage of the minnows.

The means for aerating the water in the minnow chamber includes a water inlet 23 into the air chamber and an air inlet 24 from the air chamber into a minnow chamber. The combined air chamber and minnow chamber is partly and almost wholly submerged in water in the pail 10, so that the air chamber is entirely surrounded by water, the bouyancy of the air chamber being overcome by the weight of the combined air chamber and minnow chamber, and also by clamping means between the combined air chamber and the minnow chambers and the rim of the pail 10. The aperture 24 in position at the topmost point of the partition 20 between the minnow chamber and the air chamber. The exit of air from the air chamber is governed largely by the water inlet 23, but the diameter of the aperture 24 must be sufficiently small so as to retard the passage therethrough of the water from the minnow chamber. The small aperture, the surface tension of the water, and the pressure of the air in the air chamber all combine to prevent the passage of water from the minnow chamber through the aperture. Neither can air pass upwardly through the aperture 24. When these factors are in equilibrium, the water inlet 23 is designed to disturb this equilibrium and thus cause air to pass from the air chamber to the minnow chamber. The water inlet consists of a tube of small diameter at the side of the air chamber and having its inlet on the level of bottom wall 18, the outlet of the tube being in the top of the air chamber. For governing the rate of flow through the tube, there is provided a petcock 25 in the tube at the lowermost extremity for regulating the flow of water through the tube or for shutting off the flow entirely. It will be obvious that the water passing through the water inlet 23 will displace air in the air chamber and the displaced air has as its only exit the aperture 24.

The aerator can function only until the air chamber becomes filled with water and, for this reason, means must be provided for occasionally draining the water from the air chamber. The valve 26 is positioned at the lowermost point in the air chamber, and is designed to be completely closed when the valve stem rests on the bottom of the pail 10, but which automatically opens when the combined minnow and air chamber is lifted from the bottom of the pail. By occasionally lifting the combined minnow chamber and air chamber above the level of the water in the pail 10, the parts may be kept in operative position with the expenditure of the minimum of time and trouble.

The lid 15 is of the usual kind, having a flange 27 that seats within the top opening of the minnow pail. It is also provided with a bail handle 28 for convenience in use. The purpose of the lid is to prevent the splashing of the water during the transportation of the minnow pail. Clamps 29 of any suitable kind are employed for preventing displacement of the combined minnow chamber and air chamber. In the present instance the clamps are hingedly secured to the rim 17 to be clamped over the rolled edge 12 of the pail 10. Likewise, the lid 15 may be protected against displacement or loss by the use of a chain 30 having a snap at its free extremity.

Having thus described my invention in such full, clear, and exact terms that its construction and operation will be readily understood by others skilled in the art to which it pertains, what I claim as new and desire to secure by Letters Patent of the United States is:

1. A minnow pail including an air chamber with a minnow chamber of reticular walls above said air chamber and integral therewith, the upper wall of said air chamber being convex and being provided with an orifice of small diameter communicating with said minnow chamber, means for conducting water into the upper portion of said air chamber to thereby force air from said air chamber through the orifice thereof and into said minnow chamber, means for governing the rate of flow of the water into said air chamber, and a valved outlet in the bottom of said air chamber for discharging the water therefrom.

2. A minnow pail including an outer pail and an inner unit, said inner unit including an air chamber and a minnow chamber thereabove, said air chamber being provided with an orifice of small diameter for the passage of air from said air chamber to said minnow chamber, a conduit of relatively small diameter for conducting water from the level of the bottom of said air chamber to the top portion of the interior thereof for forcing air out through the orifice of said air chamber, said air chamber having also an aperture in the bottom wall and a valve having a stem adapted to seat on the bottom of said outer pail to hold said valve in closed position whereby said air chamber may be drained by the lifting of said inner unit.

3. A minnow pail including an outer pail and an inner unit, said inner unit including an air chamber of cylindrical form and having upper and lower walls which are dished outwardly and including also a cylindrical minnow chamber above said air chamber and integral therewith, the cylindrical wall of said minnow chamber being provided with apertures for the passage of water, said air chamber having a minute orifice at its topmost point for the passage of air into said minnow chamber, means for introducing water into the top portion of said air chamber to thereby force air through the orifice of said air chamber, and means for draining out the water from said air chamber.

WINFIELD H. HARTFORD.